June 4, 1929.  G. FICKEN  1,715,699
DEVICE FOR PROTECTING THE WORKING OF THREE-PHASE MOTORS.
Filed Feb. 27, 1925
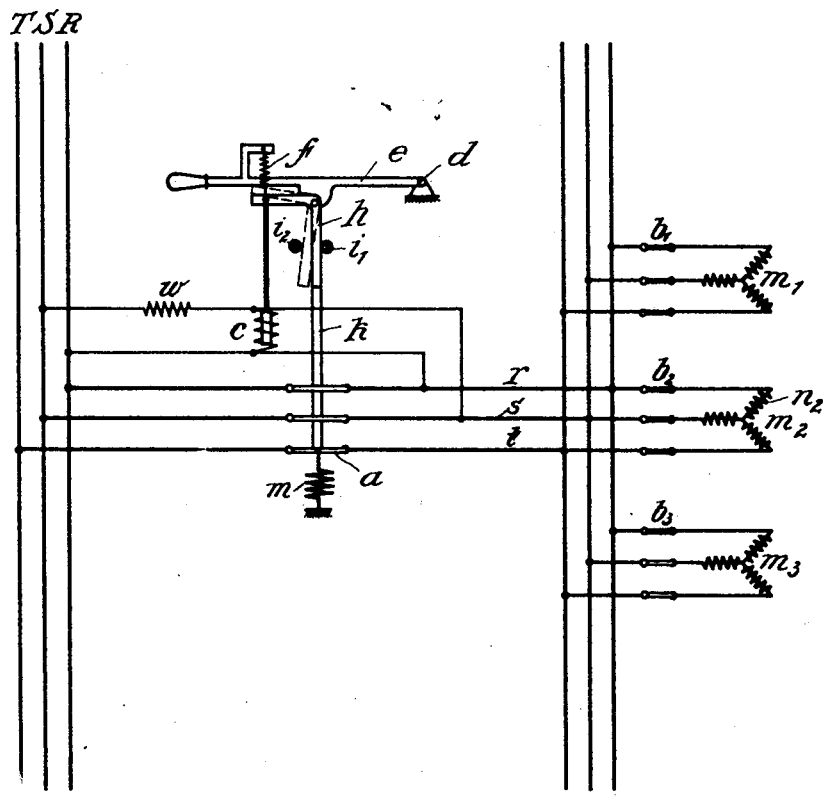
INVENTOR
*Gerd Ficken*
BY
ATTORNEY Patented June 4, 1929.

1,715,699

UNITED STATES PATENT OFFICE.

GERD FICKEN, OF HAMBURG, GERMANY, ASSIGNOR TO WESTINGHOUSE ELECTRIC & MANUFACTURING COMPANY, OF NEW YORK, N. Y., A CORPORATION.

DEVICE FOR PROTECTING THE WORKING OF THREE-PHASE MOTORS.

Application filed February 27, 1925, Serial No. 12,034, and in Germany February 28, 1924.

My invention relates to improvements in devices for protecting the operation of three-phase motors.

For the protection of three-phase motors, no-voltage relays are employed which trip the motor switch on failure of voltage. As the provision of a no-voltage relay for each motor of a plant having a number of small motors is too expensive a plurality of motors may be combined into a group and this group equipped with a common no-voltage relay. This arrangement has the disadvantage that when the relay has released the main switch on failure of voltage, the individual switches of the motors must also be opened so that when the main switch is closed again the supply voltage is not connected with the low-resistance stator windings. In extensive networks it is not easy to ascertain whether the stator switches are open. The switchboard attendant is obliged to walk round and see that all the motors are disconnected before throwing the main switch in again.

My invention consists of a device by means of which this drawback is eliminated. According to my invention, provisions are made to prevent the reclosure of the no-voltage relay so long as a stator switch is closed. This result is attained by connecting the voltage coil of the tripping mechanism across one phase of the source of current through a series resistance and also across the corresponding phase of the motor circuit so that the voltage coil is under full voltage when the main switch is closed. After the release of the switch, the stator windings of one or more of the motors are, however, connected in parallel with the voltage coil through any stator switches of the motors which may be still closed thereby causing such a drop of voltage in the series resistance that the voltage coil no longer receives the necessary voltage and current to retain the armature of the no-voltage relay. The switchboard attendant sees from the fact that the no-voltage switch cannot be closed again that one of the stator switches is still closed.

In the drawing affixed to this specification and forming part thereof, a preferred form of the device is illustrated by way of example.

Referring to this drawing, it will be seen that the source or supply circuit RST feeds the motors $m_1$, $m_2$, $m_3$ through the main switch $a$ and the feeders $r$, $s$, $t$. $b_1$, $b_2$, $b_3$ are the stator switches. The rotors of the machines and the starters are not shown. The voltage coil $c$ of the no-voltage release is connected with the phases R and S of the supply circuit through the resistance $w$ and also to feeders $r$ and $s$ in the motor circuit. The switch lever $e$ is fulcrumed at $d$. A bell-crank lever $h$ is connected to the switch lever $e$ which is controlled on the one hand by the spring $f$ and on the other hand by the pull of the voltage coil $c$. When the coil $c$ receives the full potential, the bell-crank lever $h$ turns around its fulcrum against the resistance of the spring $f$ until it comes in contact with the stop $i_1$ and the switch lever $e$ now permits the closing of the switch $a$ by means of the rod $k$. When the coil $c$ is de-energized or only partially energized the spring $f$ pulls the bell-crank lever $h$ into the position indicated in broken lines against the stop $i_2$ and the switch $a$ is opened by the previously compressed spring $m$. As long as the coil $c$ remains de-energized, the switch $a$ cannot be closed because the bell-crank lever $h$ passes the switch rod $k$ without coming in contact with it.

If the switch $a$ trips during the running of the motors owing to the failure of voltage in the network RST and if any one of the stator switches has not been opened by the attendant after the motors have stopped, the stator winding, for instance the winding $n_2$, is in parallel to the voltage coil $c$. As its resistance is very low, the current flowing through the series resistance $w$ flows for the larger part through the winding $n_2$ and only a small part through the voltage coil $c$ so that the coil is not able to turn the bell-crank lever $h$ when the switch lever is thrown in. The switch $a$ can therefore not be closed.

It will be readily understood that the mechanism illustrated in the drawing is only shown by way of example and that the apparatus may have any other suitable construction.

What I claim as my invention is:—

1. A protective arrangement for a plurality of electric motors to be energized from a polyphase system comprising a group circuit interrupter between the system and the motors, a low-voltage device for the interrupter for causing the opening thereof under low-voltage conditions, said device including a winding electrically connected across one of the phase circuits of said motors and electrical connections including a resistance connecting said winding across the corresponding phase of said system, whereby said interrupter cannot be maintained reclosed after an outage unless the motor circuits are open.

2. A protective arrangement for a plurality of electric motors to be energized from a polyphase system comprising a group circuit interrupter between the system and the motors, a low-voltage device for the interrupter for causing the opening thereof under low-voltage conditions, said device including a winding electrically connected in parallel with at least one of the motor windings, and means electrically connecting said winding to said system for preventing sufficient energization of said winding to maintain the interrupter reclosed after an outage unless the motor circuits are open.

In testimony whereof I affix my signature.

GERD FICKEN.